March 22, 1960
G. JOSEPHSON
2,929,171
COMBINATION CANDLE AND FLOWER ARRANGER
Filed March 19, 1959
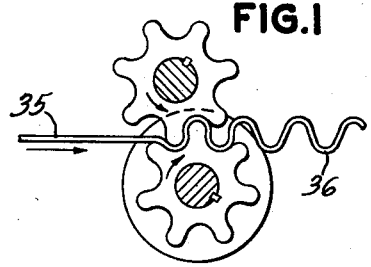
FIG. 1
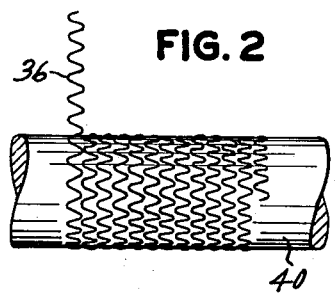
FIG. 2
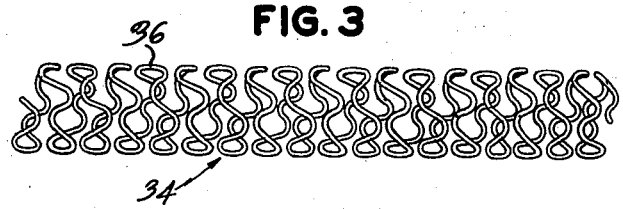
FIG. 3
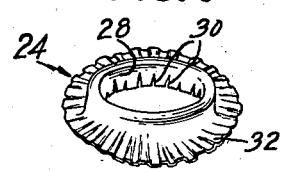
FIG. 6
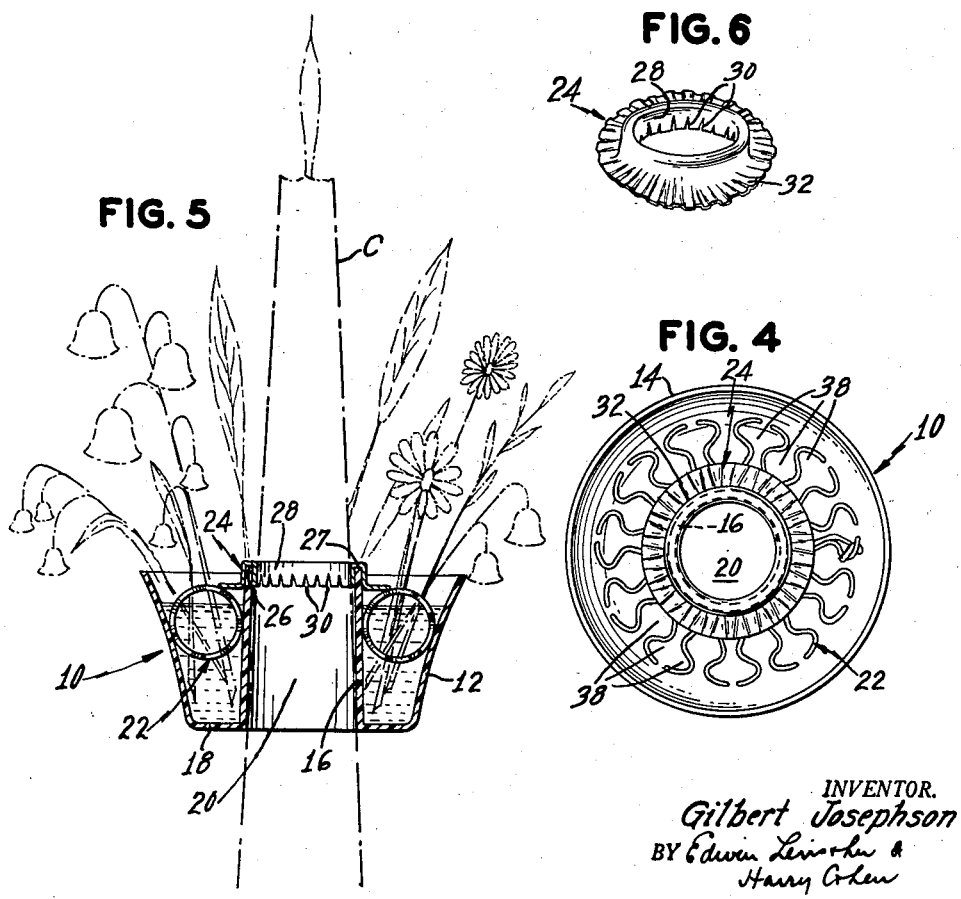
FIG. 5
FIG. 4
INVENTOR.
Gilbert Josephson
BY Edwin Levinson &
Harry Cohen
ATTORNEYS United States Patent Office 2,929,171
Patented Mar. 22, 1960

2,929,171

COMBINATION CANDLE AND FLOWER ARRANGER

Gilbert Josephson, White Plains, N.Y.

Application March 19, 1959, Serial No. 800,531

4 Claims. (Cl. 47—41)

The present invention relates to a combination candle and flower arranger.

More specifically, the invention relates to an improved candle and flower arranger in which there is provided a flower supporting member which is of a toroidal shape, and which is made of a tubular length of spirally wound crimped wire interengaged at the opposite ends thereof to define said toroidal shaped flower supporting member.

According to the invention, the combination candle and flower arranger comprises a housing member having inner and outer circumferential walls held in radially spaced relation by a bottom wall extending between the inner and outer walls at the bottom edges thereof. The inner wall defines an open ended tubular part for insertion of a candle therein, and the inner wall in conjunction with the outer wall defines a space in which the flower supporting member is removably disposed.

It is therefore an object of the present invention to provide a candle and flower arranger of improved construction.

Another object is the provision in a candle and flower arranger of a flower supporting member of crimped wire construction, whereby flowers may simply and conveniently be supported thereby in the arranger.

A further object is the provision in a candle and flower arranger having a resilient toroidal shaped flower supporting member removably disposed therein, of a removable cap for preventing the inadvertent removal of the resilient flower supporting member from the arranger.

The above and other objects, features and advantages of the present invention will be more fully understood from the following description considered in connection with the accompanying illustrative drawings.

In the drawings:

Fig. 1 is an elevational view, in section, of a mechanism for forming crimped wire;

Fig. 2 is an elevational view of a mandrel showing crimped wire walled tubing being formed thereon;

Fig. 3 is an elevational view of a length of spirally wound crimped wire tubing;

Fig. 4 is a plan view of the combination candle and flower arranger, according to the invention;

Fig. 5 is a view taken along 5—5 of Fig. 4; and

Fig. 6 is a perspective view of the cap used with the arranger, according to the invention.

Referring now to the drawings, and particularly to Figures 4 and 5, there is shown the combination candle and flower arranger 10 in accordance with the invention. The candle and flower arranger 10 comprises a housing 12 having an outer circumferential wall 14, an inner circumferential wall 16 radially spaced from said outer circumferential wall, and a bottom wall 18 which extends from the lower wall 16 to the outer wall 14 at the bottom edges thereof. Inner wall 16 is of a cylindrical tubular configuration and thus defines a passage 20 for the insertion therethrough of a candle C. A flower supporting member 22 is disposed in housing 12, and as shown, is of a toroidal configuration, surrounds the inner wall 16 and extends from the latter to the outer circumferential wall 14. It will be noted that the outer wall 14 is of generally frusto-conical configuration with the smaller dimension at the base of the housing. Due to such configuration of the outer wall, the inter-wall distance varies from the top to the bottom of the housing, and the flower supporting member is supported by the respective walls therebetween, above the bottom wall 18.

A cap 24 (Fig. 6) is adapted to releasably interengage with the upper circumferential edge of inner wall 16. For that purpose, cap 24 is provided with a circumferential groove 26 complementary to the upper circumferential edge 27 of inner wall 16. As best seen in Fig. 6, the inner wall 28 of groove 26 is provided with spaced slits 30 so that the groove 26, which is slightly narrower than the thickness of inner wall 16, can expand and firmly grip said inner wall when the cap 24 is snapped thereon. Cap 24 is also provided with an outwardly extending flange 32 which partially overlies flower support member 22 when the latter is in position in the housing, in order to prevent the accidental removal or withdrawal thereof.

Housing 12 is preferably made of a one piece molded plastic which is transparent. The cap 24 is preferably made out of metal, and in addition to preventing the removal of the flower supporting member, it also serves to retard the candle flame. Due to the one piece construction of housing 12, the latter is fluid tight, and water may be safely placed therein, as is usual for the purpose of keeping the flowers alive.

The flower supporting member 22 is made from a length of crimped wire tubing 34, best seen in Fig. 3. Tubing 34 comprises a coil of spirally wound crimped wire 36 having ridges or folds formed therein as undulations. The undulations define the peripheral wall of tubing 34. The peaks of the undulations may be positioned as desired along the peripheral wall of the tubing. For example, they may be arranged so as to have peaks on adjacent sides aligned to confront each other, or they may be randomly arranged. The flower supporting member 22 is obtained by taking a predetermined length of crimped wire tubing 34, and interconnecting the opposite ends thereof, in any suitable manner, resulting in the formation of a toroidal shaped member, for insertion in housing 12, in the manner previously described.

When supporting member 22 is inserted in housing 12, as described above, there is a very large number of apertures 38 along the entire surface of the supporting member. In order to support flowers in device 10, it is merely necessary to insert the stem of the flowers in diametrically opposing apertures 38 in the member 22. In this way, each stem is supported along at least two points thereof in the supporting member 22. If the stem is pushed all the way in housing 12, a third point of support may be provided by one of the walls which may be in engagement with the bottom end of the stem. It is clear that once the stems are inserted in the manner described above, they are securely held therein against lateral movement.

Referring to Figs. 1 and 2 of the drawings, there is shown therein one method for making the spirally wound undulated wire tubing 34 which is used for making flower supporting member 22. As shown, a continuous length of wire 35 is passed between a pair of gear-like members having teeth shaped to bend or crimp wire 35 into an undulated wire 36. The undulated wire 36 is then wound around a cylindrical mandrel 40 to provide a continuous length of spirally wound wire tubing 34. The undulations, as seen in Fig. 2, are positioned parallel to the axis of tubing 34 to define the peripheral wall thereof. As shown in Fig. 2, there is a predetermined arrangement of the peaks in adjacent turns of tubing 34.

However, a random arrangement of peaks in adjacent turns is equally satisfactory.

The tubing 34 is extremely flexible and resilient, and can thus be shaped according to any predetermined pattern. For the preferred embodiment shown in Figs. 4 and 5, a toroidal shape is provided by merely taking a predetermined length of tubing interconnected at the opposite ends thereof as hereabove explained.

Thus it is seen that the combination candle and flower arranger is especially well suited to support flowers by means of the crimped wire toroidal shaped flower supporting member, and is equally well suited to simultaneously define means for accommodating a candle without in any way interfering with the function of the arranger for supporting flowers.

This application is a continuation-in-part of my United States application, Serial No. 706,772, filed January 2, 1958.

While I have shown and described the preferred embodiments of my invention, it will be understood that the invention may be embodied otherwise than as herein specifically illustrated or described, and that in the illustrated embodiment certain changes in the details of construction and in the form and arrangement of parts may be made without departing from the underlying idea or principles of this invention within the scope of the appended claims.

Having thus described my invention, what I claim and desire to secure by Letters Patent is:

1. A combination candle and flower arranger, comprising a housing member having inner and outer circumferential walls held in radially spaced relation by a bottom wall extending between said inner and outer walls at the bottom edges thereof, said inner wall defining an open ended tubular part for insertion of a candle therein, a flower supporting member removably disposed in said housing in surrounding relation with said inner circumferential wall and extending from the latter to said outer circumferential wall, and an apertured cap having a circumferential groove complementary to the upper circumferential edge of said inner wall releasably secured thereto by interengagement of said edge in said groove, said cap having a peripheral flange extending outwardly of said groove and disposed patially over said supporting member for preventing removal thereof.

2. A combination candle and flower arranger, comprising a housing member having inner and outer circumferential walls held in radially spaced relation by a bottom wall extending between said inner and outer walls at the bottom edges thereof, said inner wall defining an open ended tubular part for insertion of a candle therein, a tubular length of spirally wound wiring interengaged at the opposite ends thereof and defining a toroidal shaped flower supporting member, said flower supporting member being removably disposed in said housing in surrounding relation with said inner circumferential wall and extending from the latter to said outer circumferential wall, and an apertured cap having a circumferential groove complementary to the upper circumferential edge of said inner wall releasably secured thereto by interengagement of said edge in said groove, said cap having a peripheral flange extending outwardly of said groove and disposed partially over said supporting member for preventing removal thereof.

3. A flower arranger, comprising a housing member having inner and outer circumferential walls held in radially spaced relation by a bottom wall extending between said inner and outer walls at the bottom edges thereof, a tubular length of spirally wound wiring interengaged at the opposite ends thereof and defining a toroidal shaped flower supporting member, said flower supporting member being removably disposed in said housing in surrounding relation with said inner circumferential wall and extending from the latter to said outer circumferential wall, and an apertured cap having a circumferential groove complementary to the upper circumferential edge of said inner wall releasably secured thereto by interengagement of said edge in said groove, said cap having a peripheral flange extending outwardly of said groove and disposed partially over said supporting member for preventing removal thereof.

4. A combination candle and flower arranger, comprising a housing member having inner and outer circumferential walls held in radially spaced relation by a bottom wall extending between said inner and outer walls at the bottom edges thereof, said inner wall defining an open ended tubular part for insertion of a candle therein, a tubular length of spirally wound crimped wiring interengaged at the opposite ends thereof and defining a toroidal shaped flower supporting member, said flower supporting member being removably disposed in said housing in surrounding relation with said inner circumferential wall and extending from the latter to said outer circumferential wall, and an apertured cap having a circumferential groove complementary to the upper circumferential edge of said inner wall releasably secured thereto by interengagement of said edge in said groove, said cap having a peripheral flange extending outwardly of said groove and disposed partially over said supporting member for preventing removal thereof, said crimped wiring providing said flower supporting member with a plurality of randomly arranged undulations between adjacent ones of which flower stems are adapted to be securely held.

References Cited in the file of this patent

UNITED STATES PATENTS

| | | |
|---|---|---|
| 1,831,258 | Owens | Nov. 10, 1931 |
| 2,003,101 | Asman | May 28, 1935 |
| 2,155,811 | Tredup | Apr. 25, 1939 |
| 2,876,587 | Saks | Mar. 10, 1959 |